(12) United States Patent
Restivo

(10) Patent No.: US 6,807,180 B1
(45) Date of Patent: Oct. 19, 2004

(54) SYNCHRONOUS METHOD FOR THE CLOCK RECOVERY FOR CBR SERVICES OVER THE ATM NETWORK

(75) Inventor: Silvia Restivo, Palermo (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/577,880

(22) Filed: May 25, 2000

Related U.S. Application Data

(63) Continuation of application No. PCT/IT98/00053, filed on Mar. 16, 1998.

(51) Int. Cl.[7] .................................................. H04J 3/06
(52) U.S. Cl. ................................... 370/395.62; 370/516
(58) Field of Search .............................. 370/503, 510, 370/512, 513, 516, 517, 518, 519, 395.1, 395.6, 395.61, 395.62; 375/354, 355, 356, 358, 371, 373, 375, 376, 362

(56) References Cited

U.S. PATENT DOCUMENTS

| | | | |
|---|---|---|---|
| 4,809,306 A | * | 2/1989 | Somer .......................... 375/376 |
| 5,812,618 A | * | 9/1998 | Muntz et al. ................. 375/372 |
| 5,844,891 A | * | 12/1998 | Cox .......................... 370/395.62 |
| 6,111,878 A | * | 8/2000 | Powell ...................... 370/395.62 |
| 6,144,714 A | * | 11/2000 | Bleiweiss et al. ............ 375/376 |
| 6,269,127 B1 | * | 7/2001 | Richards ..................... 375/282 |
| 6,606,324 B1 | * | 8/2003 | Stracca .................... 370/395.62 |

FOREIGN PATENT DOCUMENTS

EP  0 637 137 A  2/1995

OTHER PUBLICATIONS

*BT Technology Journal*, vol. 13, No. 3, Jul. 1, 1995, pp. 35–45, XP000543496, M. Mulvey et al., "Timing Issues of Constant Bit Rate Services Over ATM".

*Countdown to the New Milennium*, Institute of Electrical and Electronics Engineers, Phoenix, Arizona, vol. 2, Dec 2, 1991, pp. 402–406, XP000326005, Loau Chii–Min et al., "PHDPLL For Sonet Desynchronizer", Count.

* cited by examiner

*Primary Examiner*—Kwang Bin Yao
(74) *Attorney, Agent, or Firm*—Nixon & Vanderhye P.C.

(57) ABSTRACT

A synchronous method for clock recovery for use with constant bit rate (CBR) services over an ATM network is disclosed. A square wave related to the source frequency is compared to a square wave related to the network frequency using an exclusive OR to obtain a duty cycle transported to the receiver. The duty cycle includes information which is sufficient to recover the source clock when the network frequency duty cycle is known.

14 Claims, 12 Drawing Sheets distance of *fs* from *fs*nom expressed in ppm

SYNCHRONOUS METHOD FOR THE CLOCK RECOVERY FOR CBR SERVICES OVER THE ATM NETWORK

This application is a continuation of international application number PCT/IT98/00053 filed on Mar. 16, 1998. The benefit of this earlier filing date is claimed under 35 U.S.C. §120.

BACKGROUND OF THE INVENTION

This invention refers to the clock recovery in the transport of constant bit rate (CBR) services, suited for the implementation of the adaptation Layer 1 in asyncronous transfer mode (ATM). This adaptation layer is used for the transport of CBR services over an ATM network.

More precisely, this invention relates to a synchronous method of clock recovery in the transfer of CBR services over ATM network, based on a duty cycle timing information (DCTI).

Three methods of clock recovery in the transport of CBR services over an ATM network are presently known: synchronous frequency encoding technique (SFET); time stamp method with common network timing; and the synchronous residual time stamp (SRTS) method, which avoids the drawbacks and encompasses the advantages of the previous two ones. The said methods are respectively reported in "Synchronous Frequency Encoding Technique for Circuit Emulation", by R. C. Lau in SPIEconf. on Visual Proc. and image Comm., Pages 160–171, September 1989; in "Proposed Method to Provide the Clock Recovery Function for Circuit Emulation" in CCITT SG XVIII French contribution D.1020, December 1992; and in U.S. Pat. No. 5,260,978, the contents of all of them being herein incorporated as part of this specification.

Although the SRTS method—which is employed nowadays—gives rise to acceptable results, the search for improved methods, able to provide the clock recovery in a more satisfactory way, is always very attractive.

This invention refers to a synchronous method for the clock recovery, which is able to ensure better performances than the ones employed according to the above referenced prior art, resulting in important advantages.

SUMMARY OF THE INVENTION

The synchronous DCTI method for clock recovery according to the present invention is substantially characterised in that the square wave related to the source frequency is compared to the square wave related to the network frequency by using an exclusive OR, in order to get a signal from which duty cycle is obtained, and in that information which is necessary and sufficient to recover the source clock, when the network clock is known, is transported to the receiver by the duty cycle.

In the said method, the duty cycle of said signal is obtained by a generator which creates the actual duty cycle of the signal or its complementary to 1, in order to make the duty cycle created at the transmitter comparable to the one created at the receiver.

It should also be understood that the method according to the invention:
uses a generator of duty cycle at the transmitter and a generator of a control parameter, an oscillating system and a generator of duty cycle, which is identical to the transmitter one, at the receiver;
makes the generator of the control parameter receive the duty cycles from the transmitter and from the receiver and create by difference a parameter which feeds the oscillation system to obtain the correction of the arrival frequency in an oscillator;
makes the generator of the control parameter use the difference of the duty cycles, or the complementary to 1 of the modulus of such a difference, in the calculation of said parameter and makes the generator take into consideration two values subsequent in time of the obtained signal, in order to feed with the difference signal the oscillation system;
limits the difference signal, in the oscillation system, applies a gain factor and sums the present output to the previous one, in order to convert subsequently the obtained signal from digital to analog and to drive by means of the latter an oscillator which provides the recovered source frequency.

It is furthermore important to realise that, according to the synchronous method of the invention, the signal which is to be converted is formed by a number of bit, provided by $$B = \left\lceil \log_2\left(\frac{\Delta f}{|K|} \cdot 2^{b+1}\right) \right\rceil$$

wherein Δf is the desired capture range of the frequency around the nominal value of the frequency of said oscillator, k is the gain of the control system and b is the number of bits that has been chosen to represent the duty cycle.

BRIEF DESCRIPTION OF DRAWINGS

The invention is now described more in depth below, referring to the annexed drawings, wherein.

DESCRIPTION OF THE PREFERRED EMBODIMENT

Figure 1:
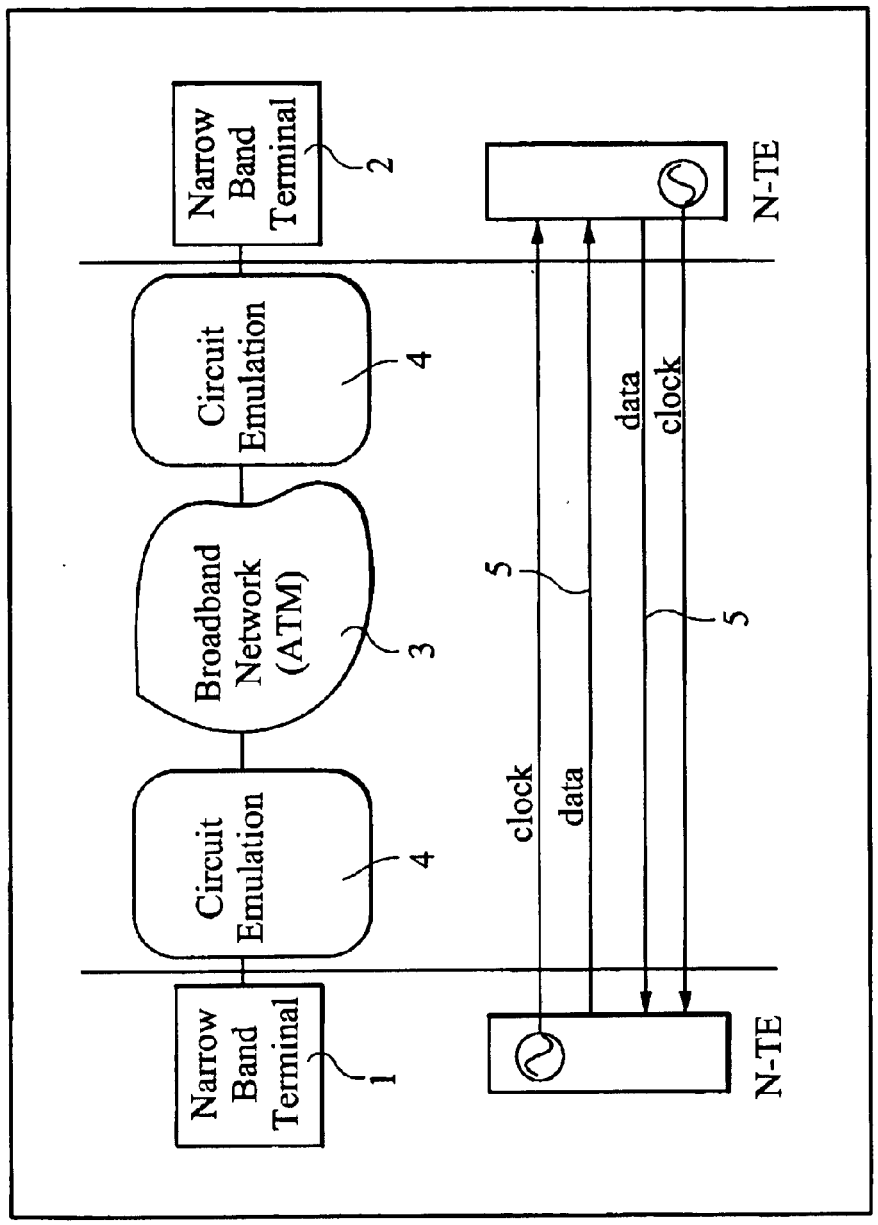
FIG. 1 schematically shows the principle of the transport of CBR services over an ATM network.

Referring now to the annexed drawings, let us consider the basic scheme in FIG. 1: two Narrow Band Terminals 1, 2 (N-TE) are sources of CBR traffic. They should establish a virtual circuit to communicate one another. The communication support available for such a communication is an asynchronous transport mode (ATM) broadband network 3.

ATM is a technology oriented to packet switching for the implementation of a broadband integrate service network (B-ISDN).

Since the transmission and the switching of such packets introduces a variable transfer delay, this kind of service transport is more suitable for the transmission of bursty traffic, for instance data. This is the reason why an adaptation for the transport of CBR traffic should be performed, in order to provide an integration between existing (N-ISDN) and future (B-ISDN) networks.

This is achievable by means of the circuit emulation (CE) functionality 4.

The circuit emulation 4 performs the adaptations needed to emulate all the services of a T1/E1 circuit that is virtually connected to the remote narrowband terminal 1. In this scenario, the circuit emulation 4 can be considered as an interworking unit between N-ISDN network and B-ISDN network.

The circuit emulation 4 interfaces, on the broadband side, the ATM cells and, on the narrowband side, a synchronous CBR signal 5.

The CBR signal 5 is segmented by the circuit emulation 4 into 376 bit units, i.e. 47 octets, and then mapped with one further octet for the adaptation Layer 1 (AAL1), into the payload field of an ATM cell.

The cell is then statistically multiplexed in the network and routed via ATM switches into the broadband network.

One of the services provided by the circuit emulation device is the recovery of the information of remote source clock. This is essential to manage the CBR service traffic correctly in a broadband network, since any frequency error in the clock controlling the destination buffer results in buffer underflow or overflow and, accordingly, in a loss of information.

The clock information in a transport service of switched circuits is recovered from the periodic arrival of the CBR traffic. This method cannot be directly applied in an ATM network, since each transported cell is affected by jitter in transfer delay, i.e. the random delay and the aperiodic arrival of cells at a destination node. This effect destroys the timing information related to the cell interarrival time.

The cell jitter is the result of multiplexing and queuing in ATM network. The cell queuing in a switch introduces a transfer delay which is related to the traffic congestion that the switch itself is experiencing. Furthermore, the congestion entity depends on the cell interarrival time distribution, which is a function of all other tributaries connected to the switch that provides the transport of ATM cells with CBR traffic. The delay introduced by cell multiplexing in the network, depends on the multiplexer service policy. If the ATM cell that carries the CBR traffic encounters various ATM switches, it can be subjected to different multiplexing policies.

The basic concept of synchronous techniques is based on the availability of a common reference clock; by taking advantage of this synchronous nature, the adverse effect of ATM cell jitter on the transport of CBR services can se totally eliminated.

All the known, synchronous methods for the clock recovery use this common clock to code information on the remote source clock, from which it will be possible to recover the same on the other side of the network. Also the method according to this invention relies on the same hypothesis and allows a very easy and suitable clock recovery, even in the presence of lost cells.

Figure 2:
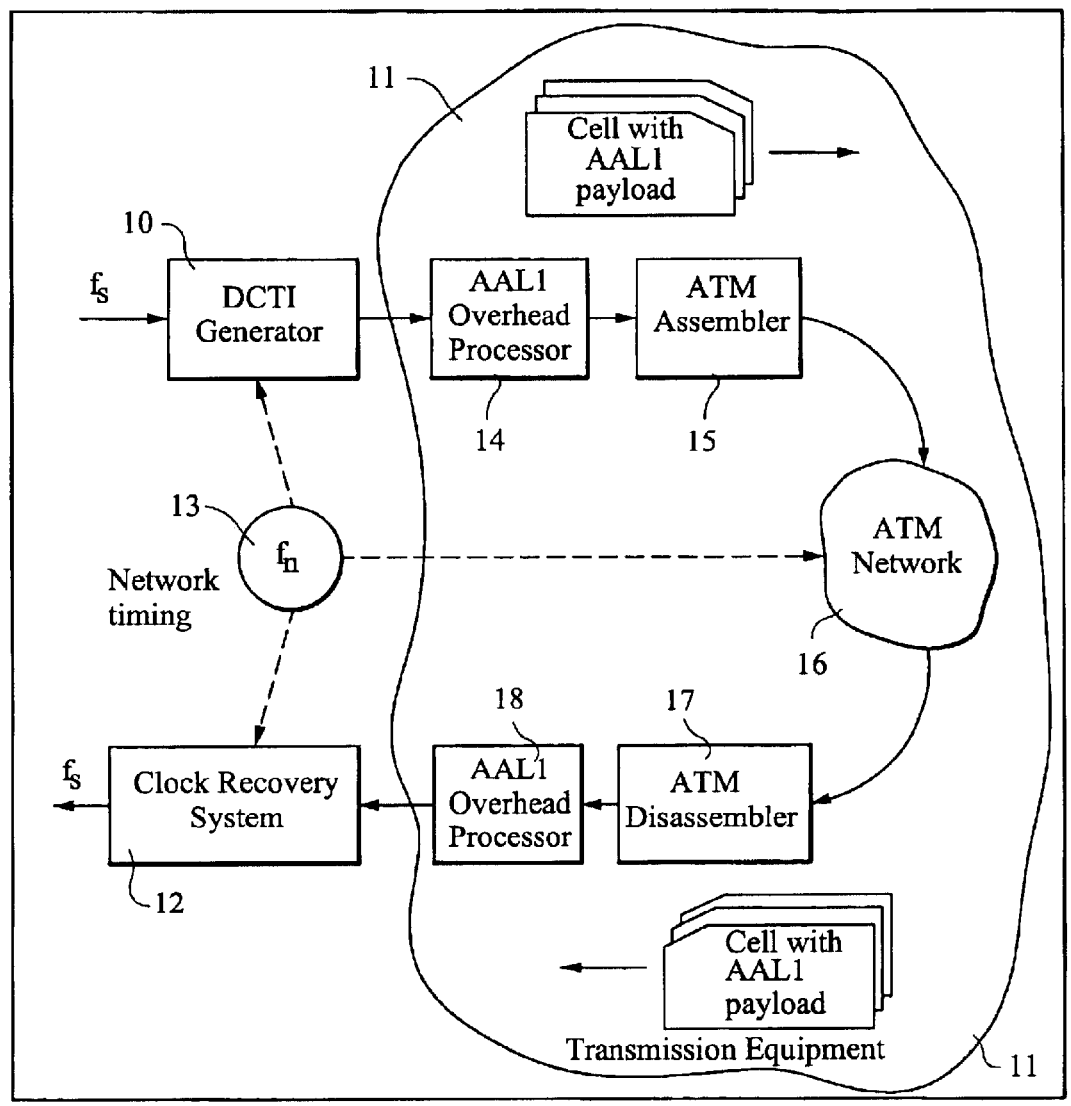
FIG. 2 is the general working scheme of synchronous methods for clock recovery, according both to the prior art and the present invention.
Figure 3:
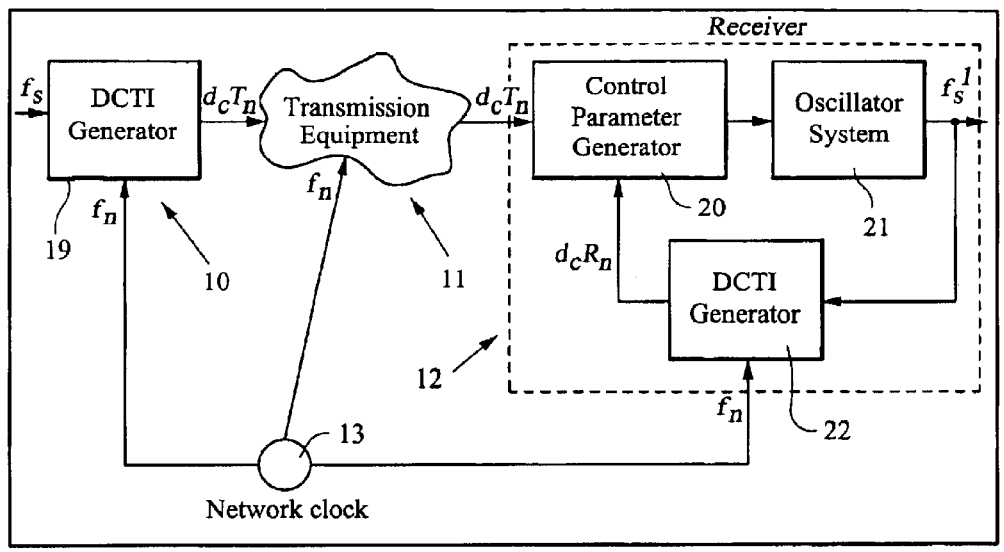
FIG. 3 is a more specific working scheme—partly more synthetic and partly more detailed—of the inventive method.

The synchronous method according to the invention is carried out according to the general scheme of FIG. 2, which has already been used in the prior art, which comprises a transmitter 10, a transmission system 11 and a receiver 12 with a system of clock recovery, all of them being connected to a common network clock 13, having a network frequency $f_n$. However, according to the present invention, the transmitter 10 and the receiver 12, better represented in the scheme of FIG. 3, are different and improved with respect to the previous ones.

Referring now to FIG. 2 and as it was already mentioned, the CBR signal is first segmented into 47 octet units and then mapped, along with an octet of adaptation layer, introduced by the processor 14 of the AAL1 into the 48 octet payload of the cell.

The cells are statistically multiplexed and routed through the ATM switches into the network 16.

The ATM cells arrive from the broadband network to the receiving side and are deassembled and processed, so as to separate the AAL1 octet in the deassembler 17 and processor 18, where AAL1 protocol is terminated and the 47 octet corresponding to 376 bits of the CBR flow are extracted from each cell.

The scheme depicted in FIG. 3 shows that, according to the invention, the transmitter 10 is comprised of a DCTI generator 19, while the receiver comprises a generator of the control parameter 20, an oscillation system 21 and a DCTI generator 22, which is identical to the one 19 of the transmitter. The generator 19 is represented in detail in FIG. 4, generator 20 in FIG. 5 and the oscillation system 21 in FIG. 6.

Figure 7:
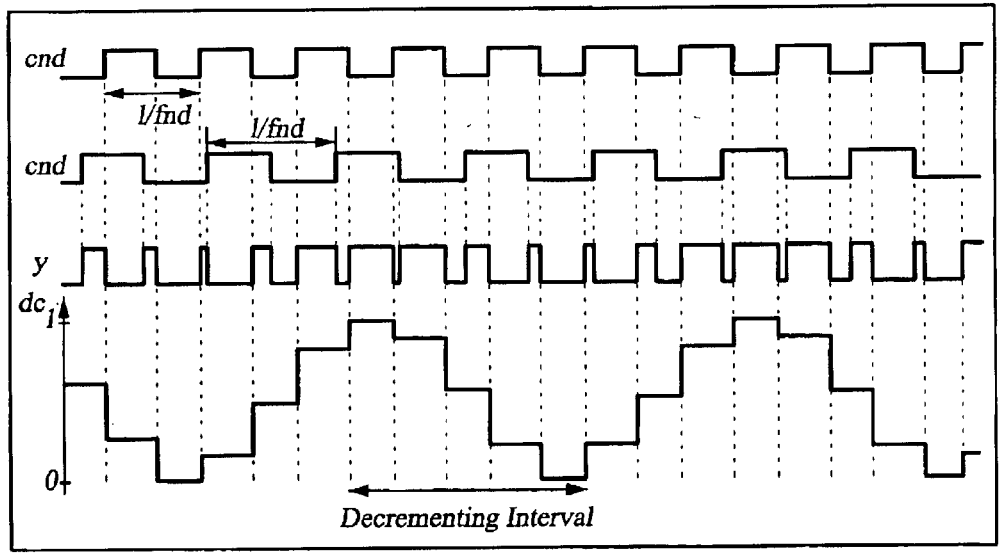
FIG. 7 graphically summarises the basic idea of the method according to the invention.
Figure 8:
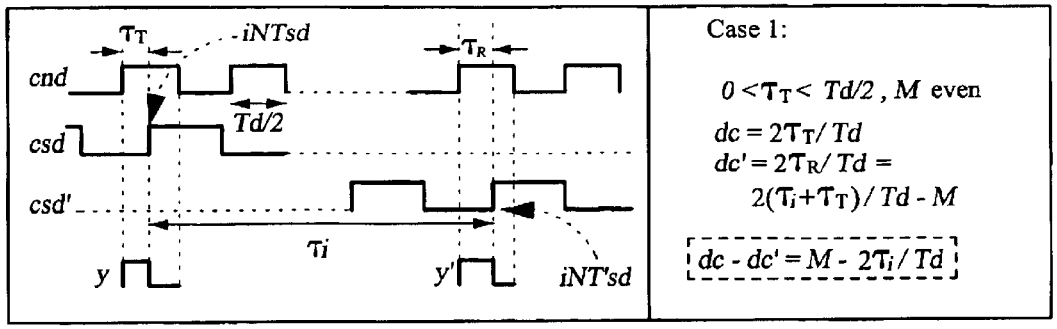
FIGS. 8, 9, 10 and 11 analyse the possible cases that can arise in the development of the present invention by means of graphs and tables.
Figure 9:
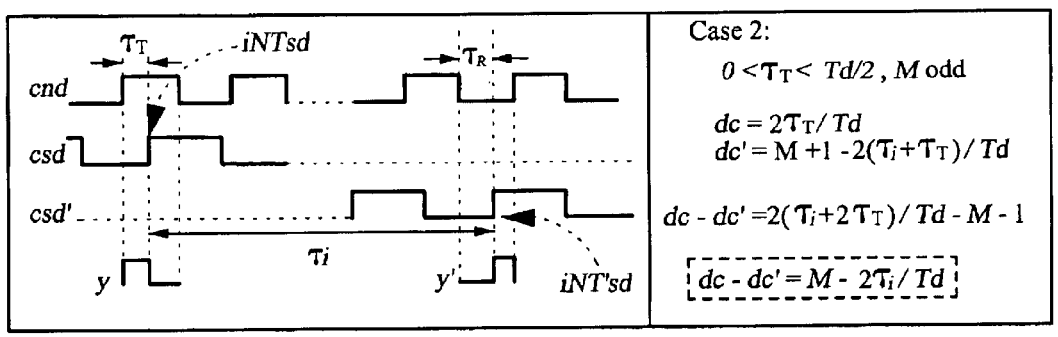
Figure 10:
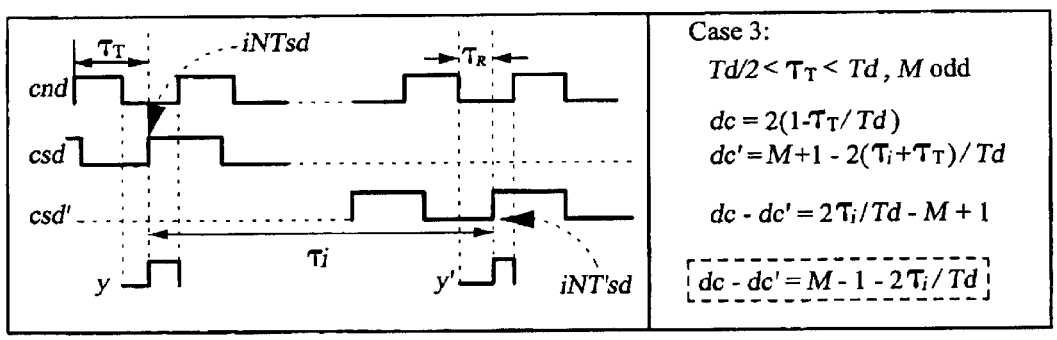
Figure 11:
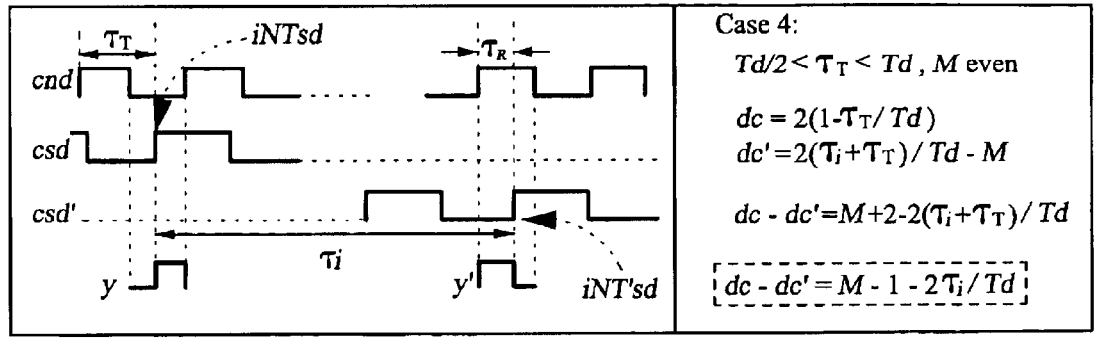

By using the scheme of FIG. 3 and taking into account that, in the following, reference is made:

with $f_n$ to the frequency of the network clock with $f_{nd}$ to the frequency of the derived network clock ($f_{nd}=f_{nd}$; wherein D is an integer;

with $c_{nd}$ to the square wave having frequency $f_{nd}$;

with $f_s$ to the frequency of the source clock;

with $T_s$ to the period of the source clock ($T_s=1/f_s$);

with $f_{sd}$ to the frequency of the derived source clock ($f_{sd}=f_s/D_s$, wherein $D_s$ is an integer);

with $c_{ds}$ to the square wave having frequency $f_{sd}$; and with Y to the EXOR between $c_{sd}$ and $c_{nd}$, the method according to the invention comprises essentially comparing—see FIG. 7—the square wave $c_{sd}$, which is related to the source frequency, to the square wave $c_{nd}$ which is related to the network frequency, by using an exclusive OR (EXOR), in order to get a signal y, the duty cycle of which is obtained. By means of the duty cycle of said signal y, Information necessary and sufficient to recover the source clock when the network one is known is transported to the receiver. More precisely, the duty cycle of he signal y (dc) transports the information about the frequency of the source clock, the network one being known, to the receiver each $1/(2*f_{sd})$ seconds, so as to allow to correctly recover the frequency of the source clock at the receiver.

Figure 4:
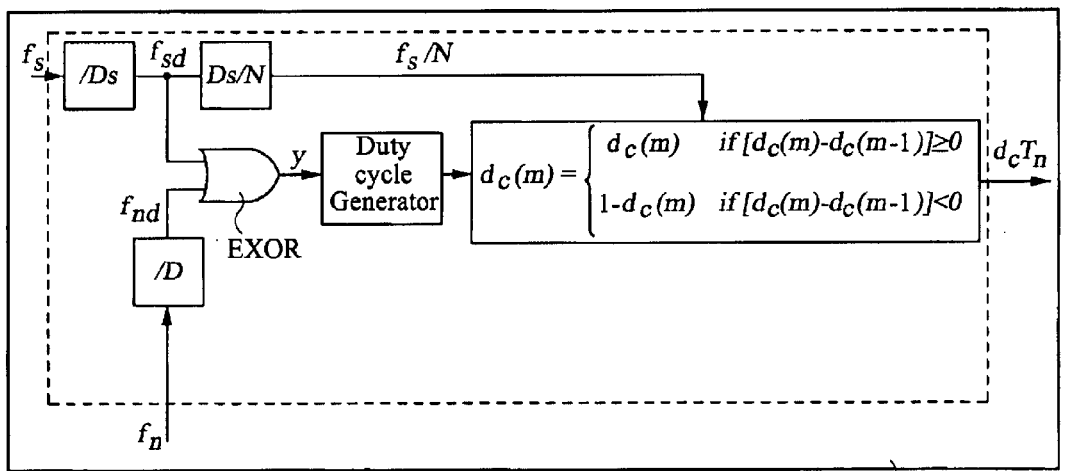
FIG. 4 schematically represents the DCTI generator provided in the transmitter and in the receiver by which the inventive method is implemented, according to FIG. 2.

FIGS. 3 and 4 are to be considered once more, in order to better discuss the method according to the invention.

The generator DCTI, depicted by FIG. 4, is a block which receives $f_s$ and $f_n$ as input, makes the divisions (by D and $D_s$, vide infra) which are necessary to make the two considered frequencies comparable and in order to make the output of the exclusive OR (EXOR) significant, makes the exclusive OR operation, creates the signal duty cycle and samples the same in selected instants. All of these operations are performed at both the transmitter and the receiver side (both comprising an identical DCTI generator, as previously mentioned).

The information is then inserted in the ATM cells, so as to generate the least overhead which is possible; to this end, the signal dc is sampled every Q cell periods, wherein Q is an integer and the cell period is $T_c=376\ T_s=376/f_s$. If $N=376Q$, the sampling period may be written as $NT_s$.

Figure 6:
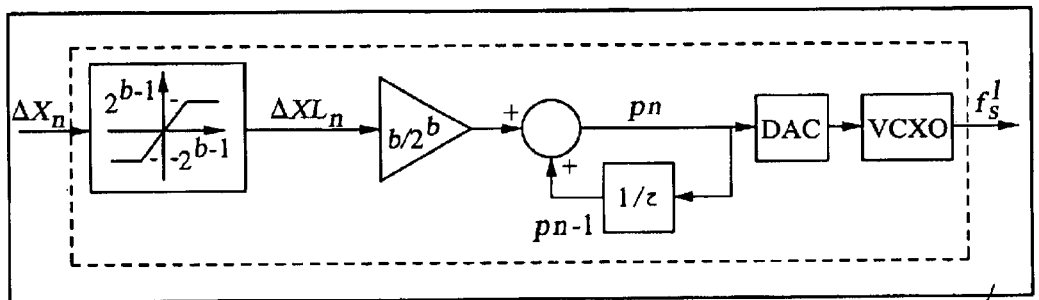
FIG. 6 is a scheme of the oscillation system provided in the receiver by which the method of this invention is implemented, according to FIG. 3.

Now, let us suppose to create the duty cycle signal at the transmitter (dc) and at the receiver (dc'); the i-th sampling instants will be $iNT_s$ and $iNT_s+t_o$, respectively, wherein $T_{s'}$ is the period of the recovered source clock at the receiver and $t_o$ is the initial phase difference between the frequency of the source clock ($f_s$) and the one ($f_{s'}$) of the VCXO oscillator (see FIG. 6). Once:

$$\tau_i = |iNT_s - iNT_{s'} - t_o|$$

is defined, the condition that leads to a correct clock recovery is:

$$\tau_i = \tau_i + 1$$

Obviously, a relationship connects dc, dc' and $\tau_i$. Therefore, $D_s$ is chosen so that $N/D_s$ is an integer and the following are defined:

$\tau_i$: timing gap between $iNT_{sd}$ and the previous rising edge of $c_{nd}$;

$\tau_r$: timing gap between $iNT_{sd}$ and the previous rising/falling edge of $c_{nd}$;

M: a function of $\tau_i$ and $\tau_r$; $M=f(\tau_i, \tau_r)=$ $$\left\lfloor \frac{2}{T_{nd}}(\tau_i + \tau_t) \right\rfloor$$

Using M, $\tau_r$ can be written as: $\tau_r = \tau_i + \tau_t - MT_{nd}/2$. In order to evaluate dc and dc', it is to consider four different cases, which depend on M and on the range of $\tau_t$. Such cases are analysed in the graphs and tables of FIGS. 8 to 11 of annexed drawings.

If the difference between the present and the previous value of the duty cycle is less than zero, instead of the true value the difference:

$$1 - d_{c(TX)}\left(n\frac{T_{nd}}{2}\right).$$

is considered

The same considerations should be made referring to the DCTI generator in the receiver. In the following, the variable $$d_{c(TX)}\left(n\frac{T_{nd}}{2}\right), d_{c(RX)}\left(n\frac{T_{nd}}{2}\right),$$

at the receiver is used to indicate the true value of duty cycle or its distance from 1, if necessary.

Figure 5:
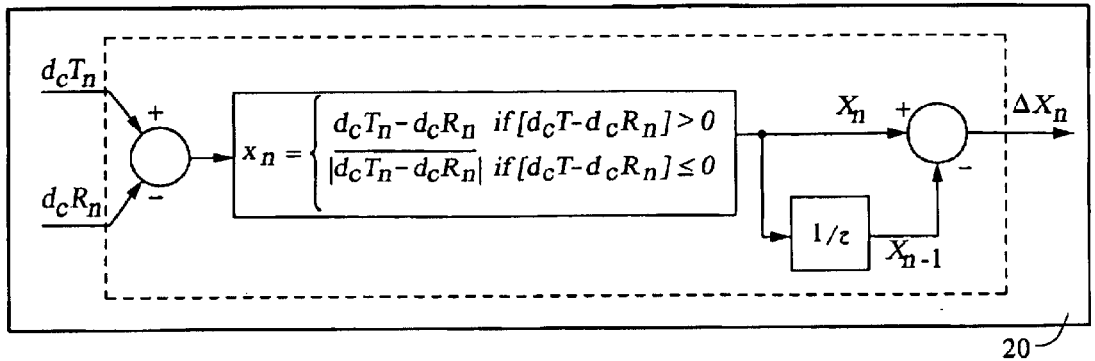
FIG. 5 schematically represents the generator of the control parameter, used in the receiver by which the method of this invention is implemented, according to FIG. 3.

FIG. 5 depicts the generator of the control parameter used, according to FIG. 3, in the method of the present invention.

This block receives the duty cycle signals as inputs, said signals being created at the transmitter and the receiver, evaluates the present value of the control parameter and subtracts the same from the previous value.

After the definition of:

$$d_{c(TX)}(n) = d_{c(TX)}\left(\left\lfloor \frac{2nNT_s}{T_{nd}} \right\rfloor \frac{T_{nd}}{2}\right)$$

$$d_{c(RX)}(n) = d_{c(RX)}\left(\left\lfloor \frac{2nNT_s}{T_{nd}} \right\rfloor \frac{T_{nd}}{2}\right)$$

the present value of the control parameter equals:

$$X(n) = d_{c(TX)}(n) - d_{c(RX)}(n) = \begin{cases} M - \frac{2\tau_i}{T_{nd}} \forall\ \tau_t \in \left[0, \frac{T_{nd}}{2}\right) \\ M - 1 - \frac{2\tau_i}{T_{nd}} \forall\ \tau_t \in \left[\frac{T_{nd}}{2}, T_{nd}\right] \end{cases}$$

When $\tau_i$, has been fixed, function X(n) periodically takes only two values, depending on the value of $\tau_t$. In order to exclude the last dependency, the control parameter becomes:

$$X(n) = M_\tau + 1 - \left(2\frac{\tau_i}{T_{nd}}\right) \forall\ \tau_t \in [O, T_{nd}]$$

wherein $$M_\tau = \left\lfloor 2\frac{\tau_i}{T_{nd}} \right\rfloor$$

namely $$X(n) = \begin{cases} d_{c(TX)}(n) - d_{c(RX)}(n) & se(\lfloor d_{c(TX)}(n) - d_{c(RX)}(n)\rfloor > O) \\ |d_{c(TX)}(n) - d_{c(RX)}(n)| & se(\lfloor d_{c(TX)}(n) - d_{c(RX)}(n)\rfloor \le O) \end{cases}$$

The last part of the generator of control parameter calculates the difference:

$$\Delta X(n) = X(n) - X(n-1)$$

which is necessary to the oscillation system to drive the VCXO correctly (FIG. 6).

FIG. 6, in turn, depicts the oscillation system which completes the scheme of FIG. 3, according to which the inventive method is carried out. In the oscillation system of FIG. 6, the signal difference $\Delta X_n$ coming from the generator of control parameter is first of all limited in the clipper 24, so as to obtain system stability; then, a gain factor k is applied in 24 to the output $\Delta XL_n$ of the clipper and the present output ($\rho_n$) is summed to the previous one ($\rho_{n-1}$), so as to convert the obtained signal in 25 from digital to analog and to drive with the latter a voltage controlled quartz oscillator (VCXO) providing the recovered source frequency. It should be noted that the control action, chosen to create the control voltage driving the VCXO is:

$$p_n = p_{n-1} + \frac{k}{2^b}[\Delta XL(n)]$$

wherein $$\Delta XL(n) = \begin{cases} 2^{b-1} - 1 & \forall\ \Delta X(n) \in \{2^{b-1} \div (2^b - 1)\} \\ \Delta X(n) & \forall\ \Delta X(n) \in \{-(2^{b-1} - 1) \div (2^{b-1} - 1)\} \\ -(2^{b-1} - 1) & \forall\ \Delta X(n) \in \{-(2^b - 1) \div 2^{b-1}\} \end{cases}$$

is the clipper output, k is a negative constant, b is the number of bits chosen to represent $d_{c(TX)}(n)$ and $dc_{(RX)}(n)$.

If the capture range of the frequency is ±Δf around the nominal value $f_{s,nom}$, the number of bit B that are necessary to represent $\rho_n$ should meet the relationship:

$$2^{B-1} \le \frac{\Delta f}{|k|} 2^{b+1} < 2^B$$

hence:

$$B = \left\lceil \log_2\left(\frac{\Delta f}{|K|} 2^{b+1}\right) \right\rceil$$

The resulting p(n), that is the correction value, is applied, as already mentioned, to a D/A converter, in order to create the control voltage for the VCXO. The free-running frequency of this voltage controlled quartz oscillator equals $f_{s,nom}$.

Such component has a high degree of frequency stability with respect to the applied voltage and temperature; this is the reason why its output frequency can be considered constant for a given control voltage and for an observation time lower than or equal to 60 seconds.

The method according to the invention has been submitted to simulation, in order to test its effectiveness. The simulation has been carried out on the basis of following values:

$f_{s,nom}$=2.048 MHz
$f_n$=155.52 MHz
N=8×8×47=3008
b=3

D and $D_s$ values affect the capture range of the frequency (Δf). The system becomes stable when $\tau_i=\tau_{i+1}$, that is the wanted case, but also when $\tau_i=\tau_{i-1}+nT_d/2$. In the latter case, the receiver will recover a wrong frequency, given by $$f_{si,n} = \frac{N}{\frac{N}{f_s} + \frac{n}{2f_{nd}}}$$

Figure 12:
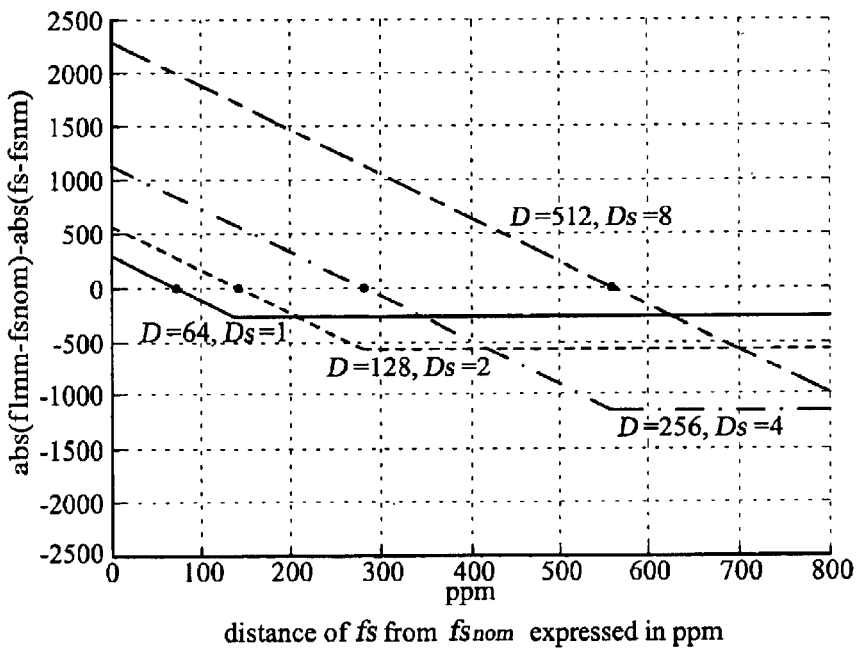
FIG. 12 shows how the capture range of the frequency in the system of the present invention is affected by D and $D_s$ values.

FIG. 12 shows the variation of $|f_{si,1}-f_{s,nom}|-|f_s-f_{s,nom}|$, depending on four pairs of D and $D_s$ values, as reported in the following table, furthermore containing the corresponding capture range of the frequency.

| D | $D_s$ | Δf |
|---|---|---|
| 64 | 1 | +70 ppm |
| 128 | 2 | +140 ppm |
| 256 | 4 | +280 ppm |
| 512 | 8 | +560 ppm |

D=256 and $D_s$=4 were chosen for simulation.

Figure 13:
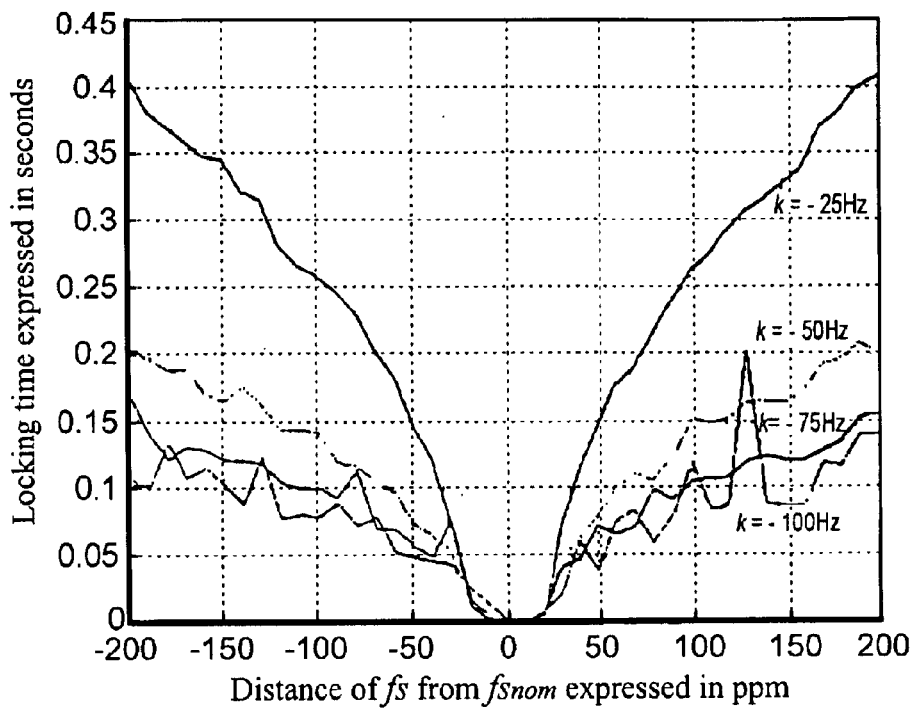
FIGS. 13 and 14 show the variations of the locking time and the steady state oscillation in the same system, depending on k value.
Figure 14:
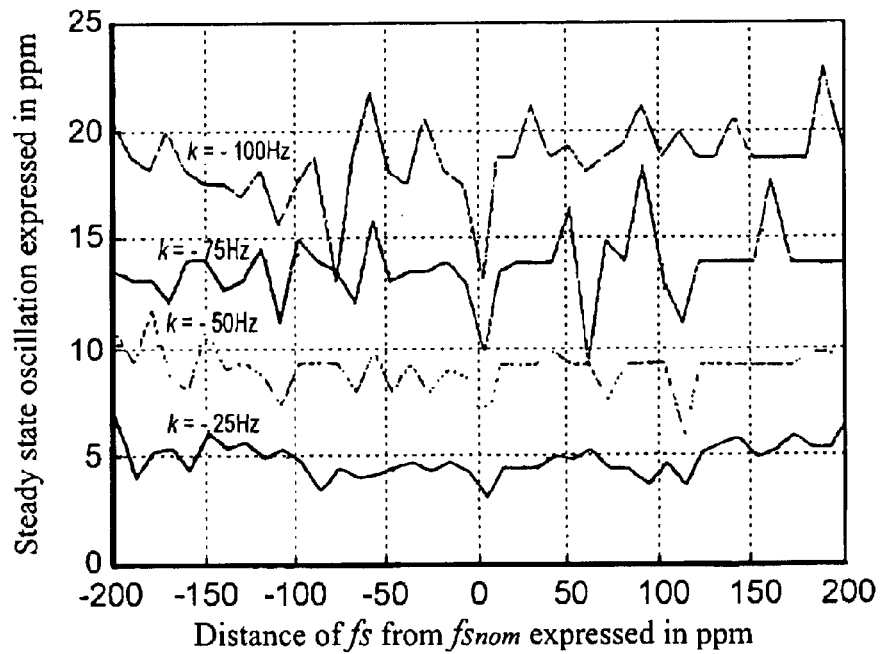

The locking time and the steady state oscillation depend on the value of k, according to the annexed FIGS. 13 and 14.

Accordingly, k=−50 Hz, hence B=7 were chosen for simulation.

Figure 15:
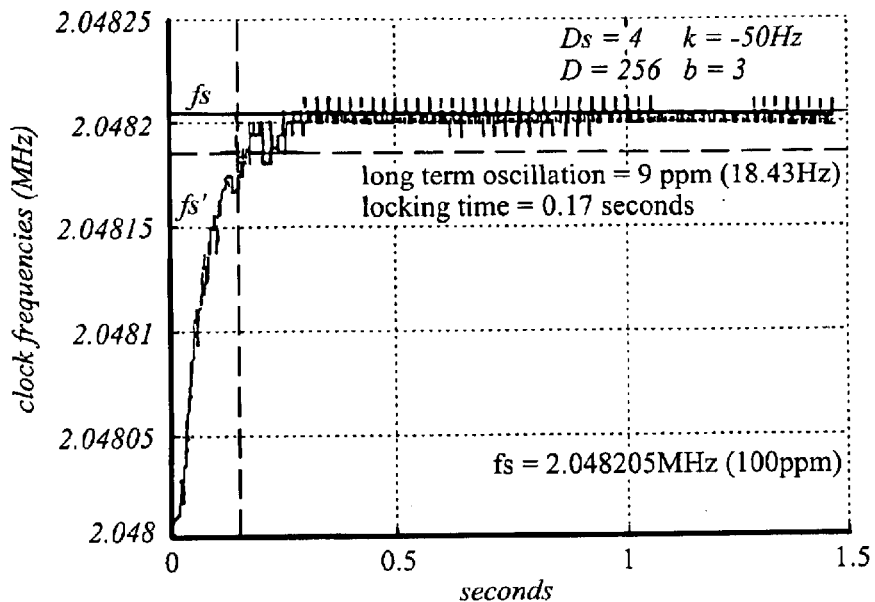
FIG. 15 is a diagram showing the response of the system when $f_s = f_{s,nom}(1+100 \text{ ppm})$, when performing the method according to the invention.

FIG. 15 shows the response with the chosen values of parameters, when $f_s=f_{s,nom}(1+100$ ppm).

Figure 16:
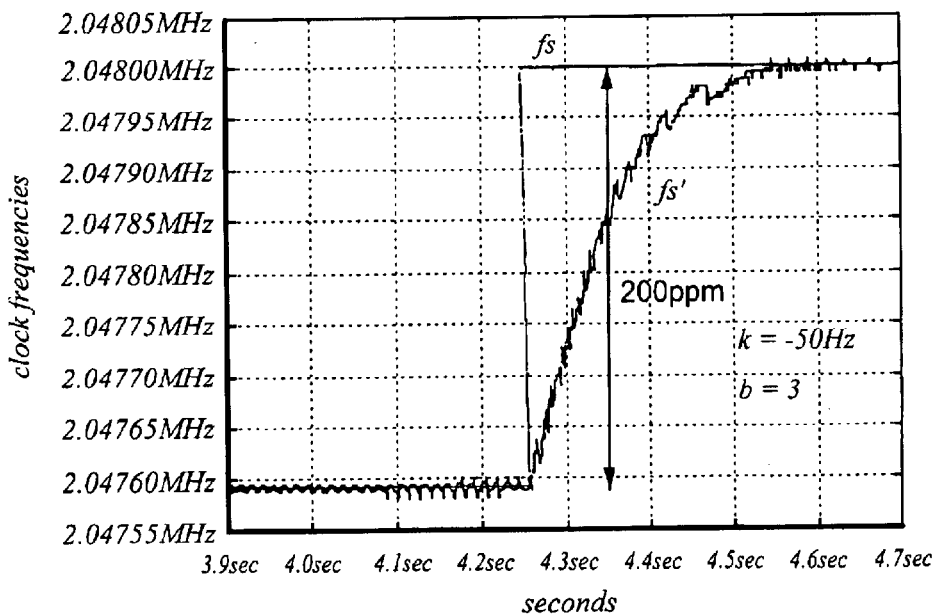
FIGS. 16, 17 and 18 are diagrams showing the responses provided by the system in very critical conditions, when performing the system according to the invention.
Figure 17:
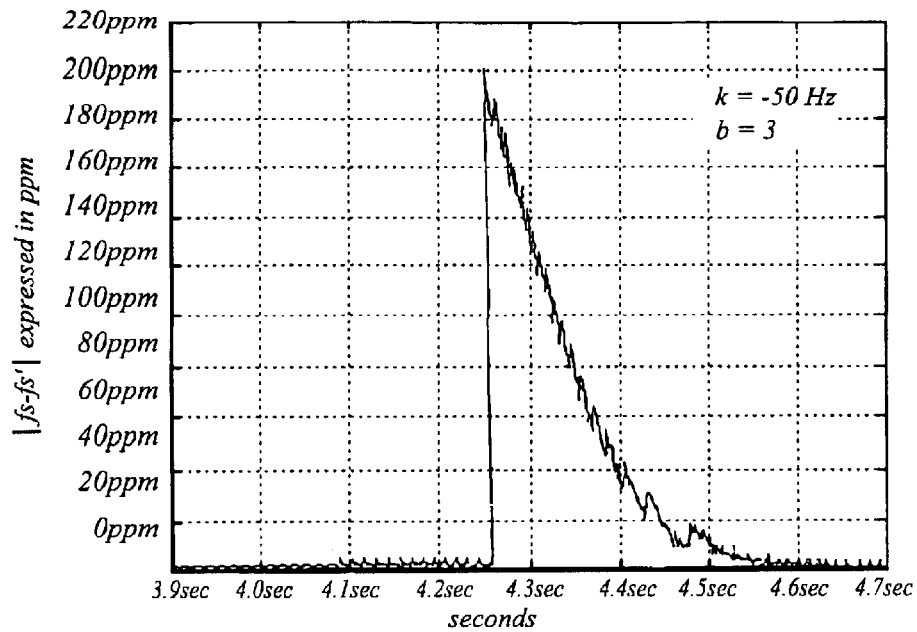
Figure 18:
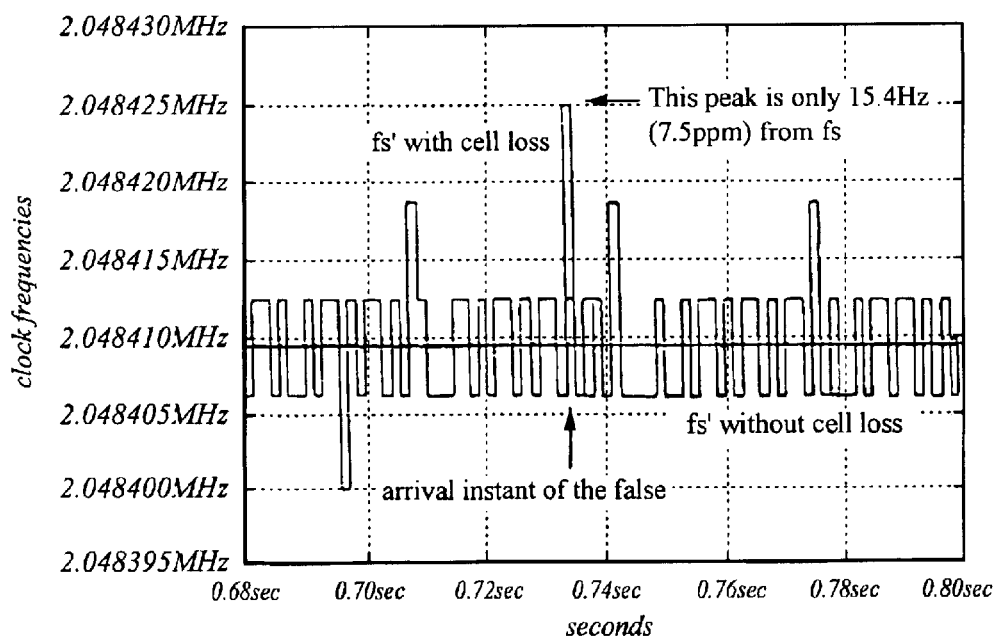

FIGS. 16, 17, 18 and 19 show the responses provided by the system when performing the method according to the invention in particularly critical conditions. Thus, FIG. 16 shows the system response to a sharp change of $f_s$, 200 ppm, in case of already stable system; on the other hand, FIG. 17 enlights error $|f_s-f^1_s|$ in the same case. FIG. 18 shows, in turn, the consequences of a cell loss. It is well-known that a cell loss during the transmission causes the arrival of a wrong $d_{c(TX)}(n)$ at the receiving side. FIG. 18 shows the effect of the arrival of said wrong value in case of already stable system.

Finally, when performing a comparison between the inventive DCTI method and the conventional SRTS method, FIGS. 19 to 23 should be considered.

Figure 19:
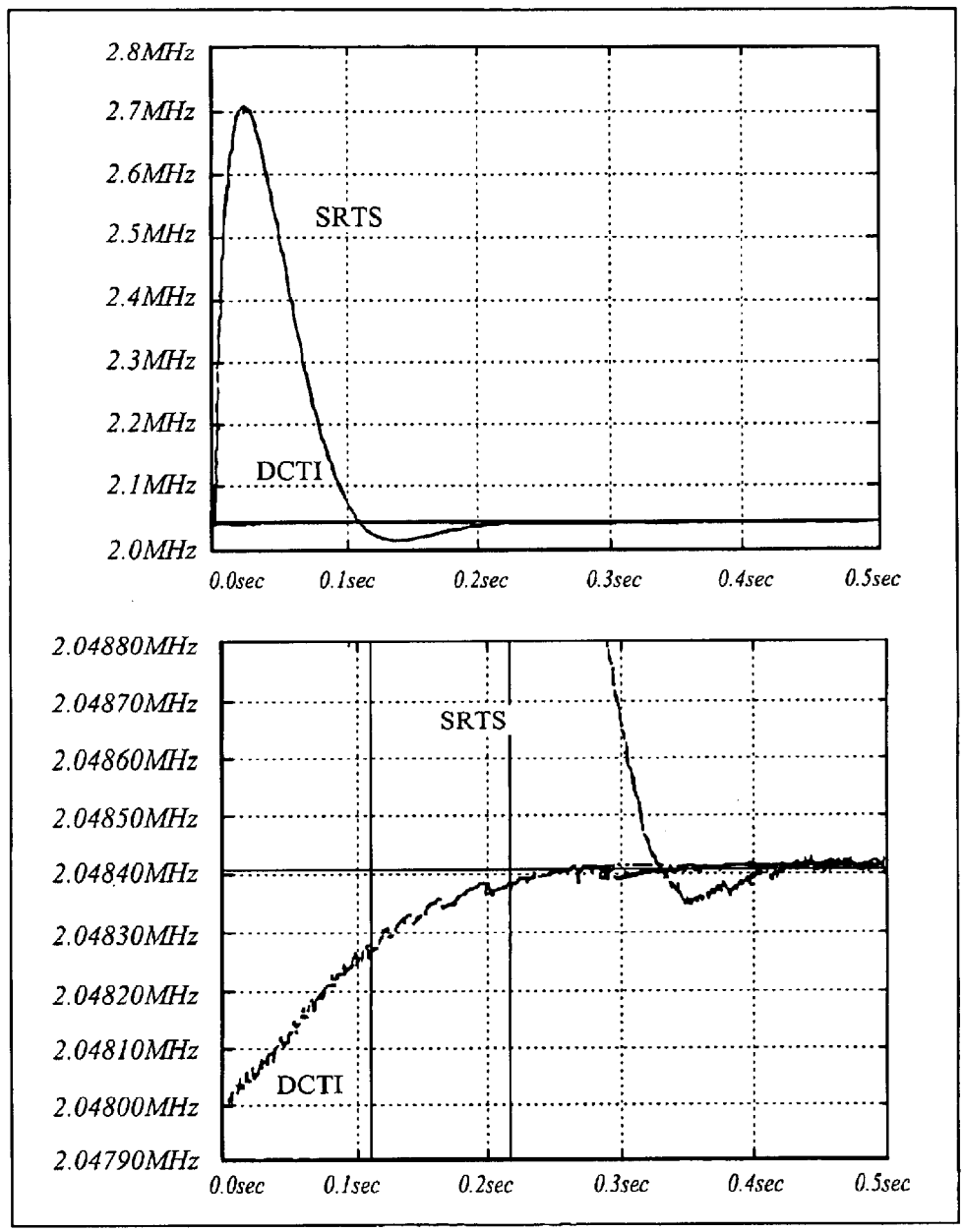
FIGS. 19 and 20–23 are graphs comparing the performances of the inventive method to the ones of the conventional SRTS method.
Figure 20:
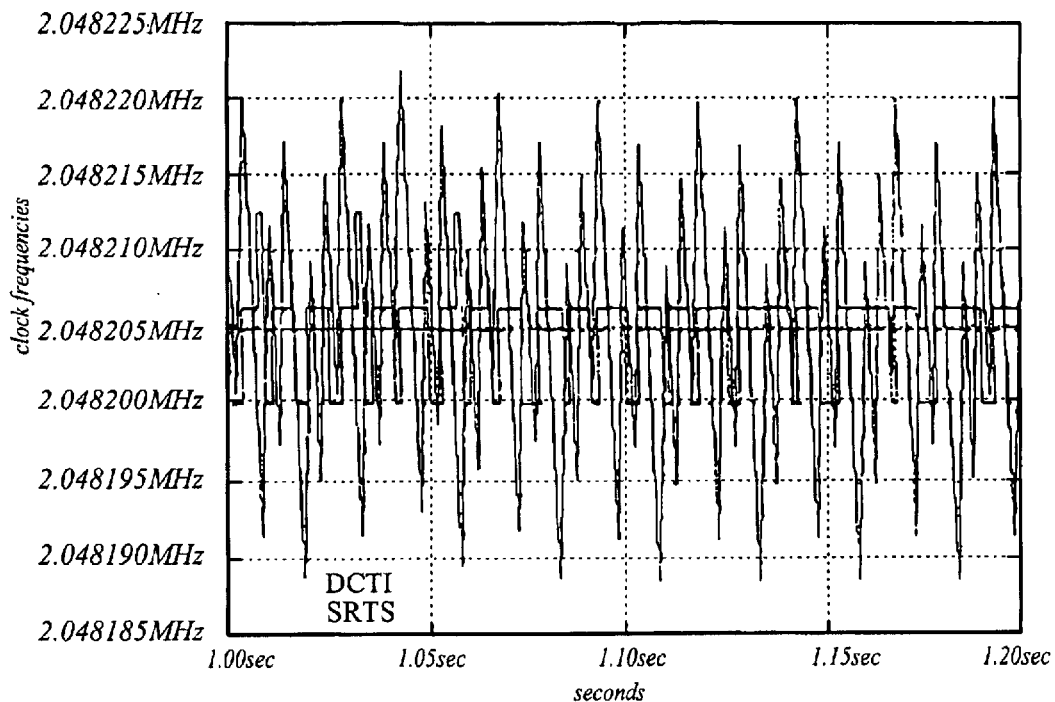
Figure 21:
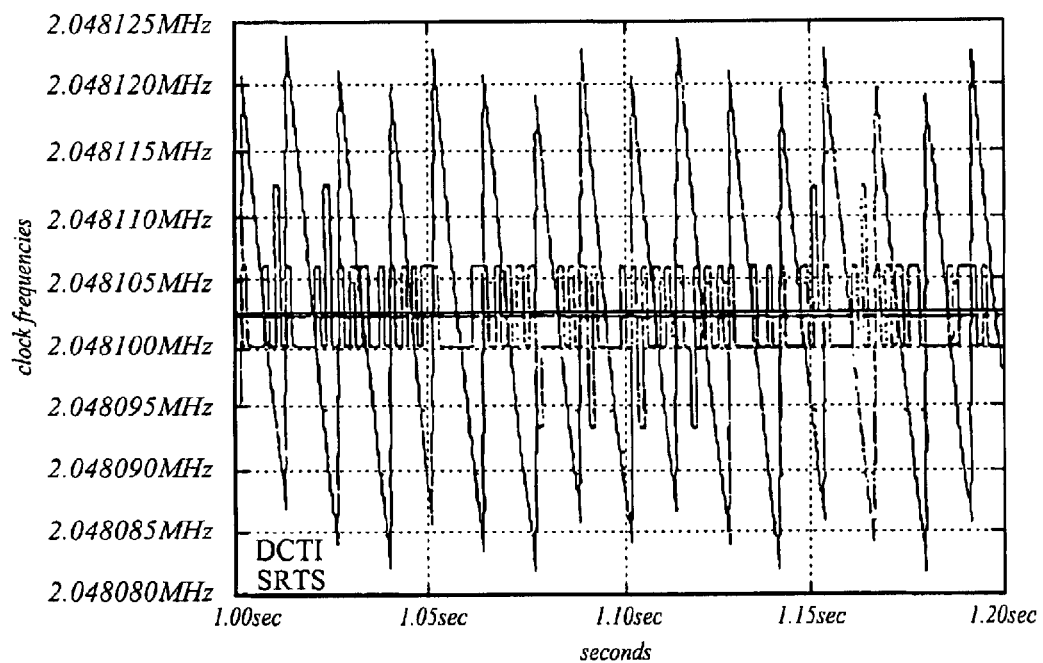
Figure 22:
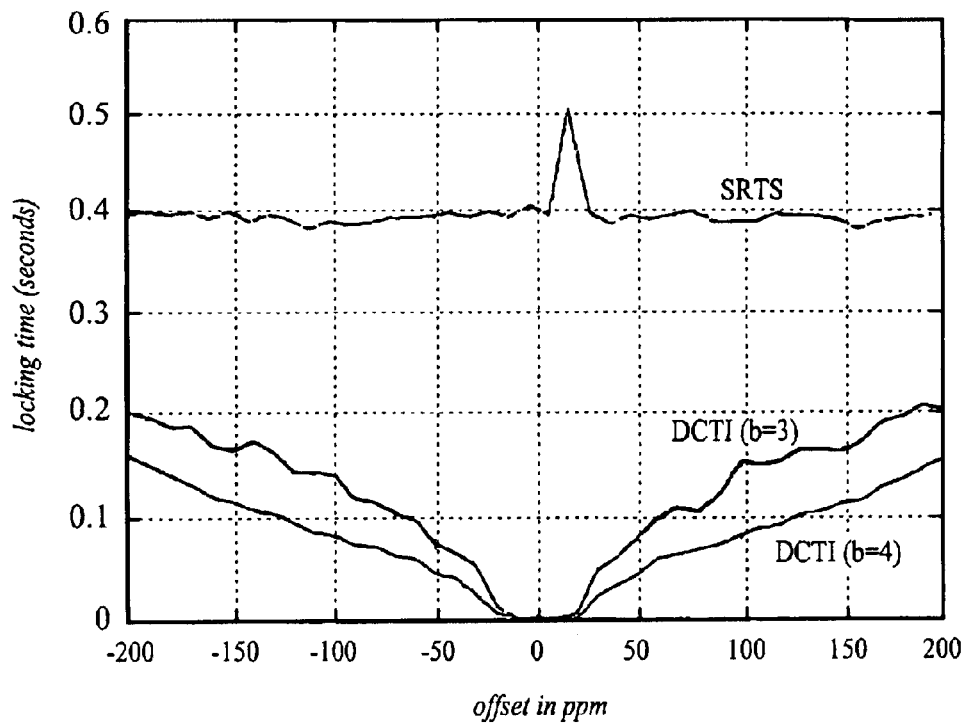
Figure 23:
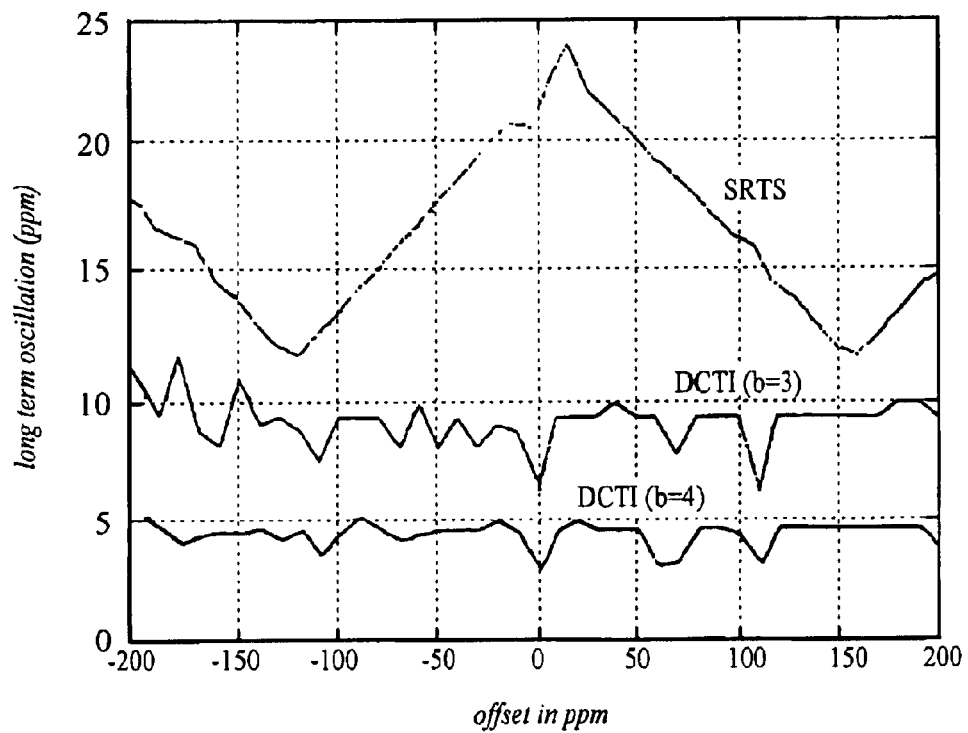

FIG. 19 compares the lockings of the two methods; FIGS. 20 and 21 compare the steady state oscillations for an offset of, respectively, 100 ppm and 50 ppm; and FIGS. 22 and 23 show the variations of locking times and of steady state oscillations in both methods.

What set forth above, and particularly the results of the carried out simulation, resulting from the related figures, allow to realise that the method according to the invention has a lot of advantages with respect to the ones of the prior art, particularly to the SRTS method usually utilised.

The main advantages are:

the width of the steady state oscillation is much lower than the one of SRTS method;

the locking time is lower than the SRTS one;

the system responds fast to sharp changes in the frequency of the source clock, since it carries out a continuous correction;

the system is only slightly affected by a cell loss, due to the limitedness of the changes in the recovered frequency;

the overhead bit rate and the probability to lose a significant cell are lower by 25% than in SRTS method, because of the number of used bits (b=3) and of their transmission on 8 cells in the CSI bit only of the first, the third and the fifth cells.

Moreover, the method parametrization allows to reach further advantages. For instance, to choose b=4 (number of coding bits) further improves the locking time and halves the width of steady state oscillation.

Finally, the invention can be applied to the clock recovery in systems where the received signal is affected by a large jitter.

The method may be implemented in a component such as a FPGA or a DSP, with addition of a small external circuit.

What is claimed is:

1. A synchronous method of clock recovery in the transport, from a transmitter to a receiver, of constant bit rate (CBR) services over an ATM network, comprising:

comparing the square wave related to the source frequency to the square wave related to the network frequency using an exclusive OR in order to get a signal from which a duty cycle is obtained, and transporting information to the receiver by the duty cycle, which information is necessary and sufficient to recover the source clock, when the network clock is known once having produced a similar duty cycle at the receiver and having compared the values of the above-mentioned duty cycle signals in subsequent timing instants.

2. A synchronous method as claimed in claim 1, wherein the duty cycle of said signal is obtained by a generator which creates the actual duty cycle of the signal or its complementary to 1, in order to make the duty cycle created at the transmitter comparable to the one created at the receiver.

3. A synchronous method as claimed in claim 1, wherein a generator of duty cycle is used at the transmitter and a generator of a control parameter, an oscillating system and a generator of duty cycle, which is identical to the transmitter one, are used at the receiver.

4. A synchronous method as claimed in claim 1, wherein the generator of the control parameter receives the duty cycles from the transmitter and from the receiver, creates by difference a parameter, uses such a parameter or the complementary to 1 of its modulus and takes into consideration two parameter values obtained subsequent in time to generate a difference signal provided to an oscillation system.

5. A synchronous method as claimed in claim 4, wherein, in the oscillation system, the difference signal is limited, a gain factor is applied, and an oscillation system output is summed with a previous oscillation system output in order to convert subsequently the obtained signal from digital to analog and to drive an oscillator which provides the recovered source frequency.

6. A synchronous method as claimed in claim 5, wherein the signal which is to be converted is formed by a number of bits B, provided by $$B = \left[\log_2\left(\frac{\Delta f}{|k|} \cdot 2^{b+1}\right)\right]$$

wherein Δf is the desired capture range of the frequency around the nominal value f of the frequency of said oscillator k, is the gain of the control system, and b is the number of bits chosen to represent the duty cycle.

7. A transmitter for synchronous clock recovery related to constant bit rate (CBR) service over an asynchronous transfer mode (ATM) network, comprising:

a comparator for comparing a time-varying source signal related to the source frequency to a time-varying network signal related to an ATM network frequency using and exclusive-OR operation;

a duty cycle generator for generating a duty cycle signal from an output of the comparator; and a transmitter for transmitting the duty signal to the receiver as part of the CBR service over the ATM network, wherein the duty cycle signal and the periodic network signal are used by the receiver to recover the source frequency.

8. The transmitter in claim 7, wherein the time-varying source signal is a square wave and the periodic network signal is a square wave.

9. A receiver for synchronous clock recovery related to a constant bit rate (CBR) service over an asynchronous transfer mode (ATM) network, comprising:

receiving circuitry for receiving a duty cycle signal transmitted from a transmitter as part of the CBR service over the ATM network, the duty cycle signal being produced by the transmitter comparing a time-varying source signal related to the source frequency and a time-varying network signal related to an ATM network frequency;

a comparator for comparing the time-varying source signal to the time-varying network signal using a exclusive-OR operation; and a duty cycle generator for generating a duty cycle signal from an output from the comparator, wherein the receiving circuitry is configured to use the duty cycle signal and the time-varying network signal to recover the source frequency.

10. The receiver in claim 9, wherein the time-varying source signal and the time-varying network signal are square waves.

11. The receiver in claim 9, wherein the receiving circuitry further comprises:

a control parameter generator for receiving the duty cycle transmitted from the transmitter and a duty cycle from the receiver to create a difference parameter, and an oscillator for receiving the difference parameter and generating a recovered source frequency.

12. The receiver as in claim 11, wherein the duty cycle generator is configured to receive as inputs the recovered source frequency generated by the oscillator and the time-varying network signal to generate the receiver duty cycle which is provided to the control parameter generator.

13. The receiver in claim 11, wherein the control parameter generator is configured to generate the difference parameter taking into consideration to successive duty cycle parameter values.

14. The receiver in claim 11, wherein the oscillator includes:

a limiter for limiting the difference parameter, an amplifier for applying a gain to the limited difference parameter, and a parameter summer for summing successive outputs from the amplifier, wherein the summer signal is coupled to an digital-to-analog converter, the output which is usable to drive an oscillator circuit which provides the recovered source frequency.

* * * * *